United States Patent
Cahill et al.

(10) Patent No.: US 11,405,102 B1
(45) Date of Patent: Aug. 2, 2022

(54) DUAL-DIRECTION OTDR SYSTEM FOR INTER-NODE COMMUNICATIONS

(71) Applicant: II-VI Delaware, Inc., Wilmington, DE (US)

(72) Inventors: Michael J. L. Cahill, Melbourne (AU); Aravanan Gurusami, Morgan Hill, CA (US); Timothy K. Zahnley, Savona, NY (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 17/220,202

(22) Filed: Apr. 1, 2021

(51) Int. Cl.
 *H04B 10/071* (2013.01)
 *H04B 10/25* (2013.01)

(52) U.S. Cl.
 CPC .......... *H04B 10/071* (2013.01); *H04B 10/25* (2013.01)

(58) Field of Classification Search
 CPC .................................................. H04B 10/071
 See application file for complete search history.

(56) References Cited

U.S. PATENT DOCUMENTS

| | | |
|---|---|---|
| 7,428,382 B2 | 9/2008 | Soto et al. |
| 8,606,117 B1* | 12/2013 | Turner ............... G01M 11/3118 398/195 |
| 8,655,166 B2 | 2/2014 | Soto et al. |
| 10,763,958 B2 | 9/2020 | Soto et al. |
| 2002/0075534 A1 | 6/2002 | Feldman |
| 2003/0020991 A1* | 1/2003 | Chang .................. H04B 10/272 398/168 |
| 2004/0022544 A1 | 2/2004 | Case |
| 2009/0016714 A1* | 1/2009 | Soto ..................... H04J 14/0252 398/20 |
| 2013/0038865 A1* | 2/2013 | McClean ........... G01M 11/3154 356/73.1 |
| 2013/0223838 A1* | 8/2013 | Horishita ............. H04B 10/071 398/13 |
| 2020/0072703 A1* | 3/2020 | Roux ................. H01L 21/76898 |
| 2020/0350986 A1* | 11/2020 | Ahadian .......... H04B 10/07955 |

\* cited by examiner

*Primary Examiner* — Nathan M Cors
(74) *Attorney, Agent, or Firm* — Blank Rome LLP (57) ABSTRACT

Modules for optical time-domain reflectometry (OTDR) are connected via at least one fiber link of a fiber optic communication network. The modules can perform OTDR operations on the at least one fiber link. In addition, the modules can establish an inter-node communication channel between each other on the at least one fiber link. The channel allows the OTDR modules to synchronize their OTDR operations and to exchange information, such as OTDR traces, between each other.

29 Claims, 6 Drawing Sheets

DUAL-DIRECTION OTDR SYSTEM FOR INTER-NODE COMMUNICATIONS

BACKGROUND OF THE DISCLOSURE

In standard operations, an optical time-domain reflectometry (OTDR) module performs optical time-domain reflectometry (OTDR) on a fiber under test. When operated, the OTDR module can check the performance of new fiber optics links and can detect problems in existing fiber links.

For example, the OTDR module is connected to an end of a fiber span. The OTDR module includes software and electronics connected to a transmitter and a receiver. Typically, the transmitter and receiver are connected to the same fiber using a circulator, for example. The transmitter, which is a high power laser transmitter, injects signals (e.g., a series of optical pulses) into the fiber under test. From the same end of the fiber, the OTDR module then receives light backscattered by the fiber (Rayleigh backscatter) or reflected back from various points along the fiber. The back-scattered and reflected light returned to the OTDR module through the fiber is then directed to the receiver in the OTDR for analog and digital processing.

When processed, the scattered or reflected light produces traces that can characterize the optical fiber. For example, the traces can indicate splice losses, can be used to measure fiber lengths, can find faults and their locations, and can measure the attenuation of the fiber. Overall, the OTDR traces show the performance of the optical components, including the cable, connectors, and splices, of the fiber link. An OTDR module can be embedded in a link or a network to monitor operation and performance. Such embedded OTDR modules offer single-ended OTDR measurement capability.

Improvements to OTDR measurements as well as other aspects of fiber-optic communication systems are desirable.

SUMMARY OF THE DISCLOSURE

A method disclosed herein is implemented at a first optical time-domain reflectometry (OTDR) module connected to at least one fiber link of a fiber optic communication network. The first OTDR module performs an OTDR operation on the at least one fiber link. When it is not performing the OTDR operation, the first OTDR module send a first communication on the at least one fiber link and receives a response on the at least one fiber link having a second communication. In response to the receipt of the second communication, the first OTDR module sends a confirmation communication on the at least one fiber link and establish a communication channel on the at least one fiber link.

The communication link can be established between the first OTDR module and a second OTDR module. A method disclosed is also implemented at the second OTDR module connected to at least one fiber link. The second OTDR module performs an OTDR operation on the at least one fiber link. When not performing the OTDR operation, the second OTDR module receives a first communication on the at least one fiber link and sends a response on the at least one fiber link having a second communication of the second OTDR module. In response to the sending of the second communication, the second OTDR module receives a resend of the first communication on the at least one fiber link and establishes a communication channel on the at least one fiber link.

As disclosed herein, an apparatus connected to at least one fiber link to perform optical time-domain reflectometry (OTDR) includes a transmitter configured to transmit optical signals; a receiver configured to receive optical signals; a connection configured to couple the transmitter and the receiver to the at least one fiber link; and a processing unit in operable communication with the transmitter and the receiver. The processing unit is configured to perform the steps of the methods described above.

The foregoing summary is not intended to summarize each potential embodiment or every aspect of the present disclosure.

DETAILED DESCRIPTION OF THE DISCLOSURE

Figure 1:
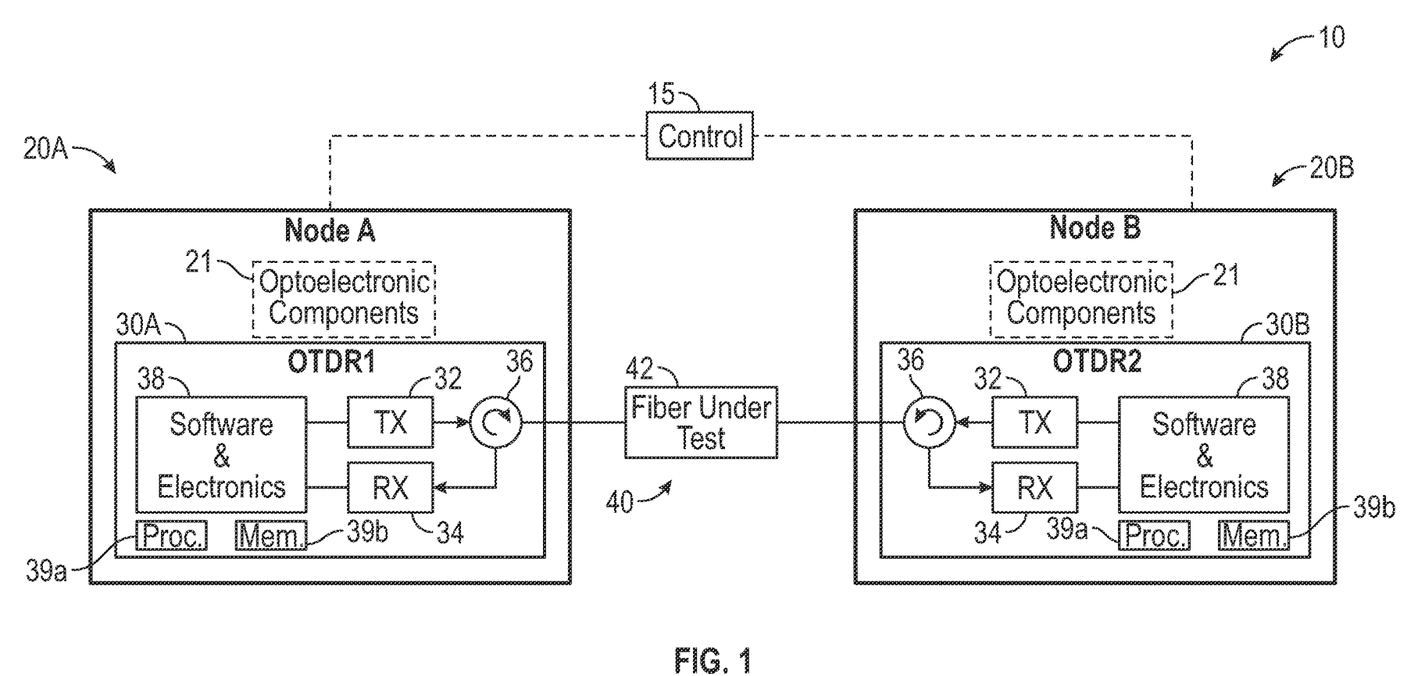
FIG. 1 illustrates a functional diagram of a fiber-optic communication system having an arrangement of dual-direction optical time-domain reflectometry (OTDR) modules of the present disclosure for providing inter-node communications over a fiber-optic link.

FIG. 1 illustrates a functional diagram of a fiber-optic communication system 10 over a fiber-optic link 40. One node 20A transmits optical signals to another node 20B over the fiber link 40. The fiber link 40 may include one or more fiber spans 42 of optical transmission fiber. Fiber spans 42 may be of any appropriate length for signal transmission in an optical communications network. The link 40 may be part of a fiber ring network, mesh network, or any other suitable network.

The nodes 20A-B can include appropriate transmitters, receivers, amplifiers and other optical or optoelectronic components 21 (only schematically indicated in FIG. 1). These components 21 can be used to transmit, receive, amplify and process optical signals over the fiber link 40. The system 10 can support an appropriate communication arrangement, such as a wavelength division multiplexing (WDM) arrangement in which multiple communications channels having different wavelengths of light are used on the fiber link 40. Each optical channel may be modulated relative to respective carrier wavelength within an appropriate range. In general, one or more channels may be used with signals modulated at slower or faster data rates about respective carrier wavelengths that are supported.

Network management or control equipment 15 can perform network management of the system 10. The network management equipment 15 can be located at the network nodes 20A-B and/or at a remote network management location. Either way, the network management equipment 15 can communicate with any of the transmitters, receivers, and other optical network equipment 21 of the nodes 20A-B using suitable communications paths. The communications paths may be based on any suitable optical or electrical paths. For example, the communications paths (for example, represented by dashed lines) may include service or telemetry channel paths, may include wired or wireless communications paths, and may involve communications paths formed by slowly modulating the normal data channels on the fiber link 40 at small modulation depths, etc.

As will be appreciated but not shown here, the fiber link 40 may include various optical components, splices, connectors, etc. The fiber link 40 may also include various optical network equipment modules, such as add/drop modules, optical switches, dispersion compensation modules, dynamic filter modules, or any other suitable optical network equipment.

The network management equipment 15 associated with the system 10 can acquire optical time domain reflectometry traces using OTDR modules 30A-B at the nodes 20A-B. These OTDR modules 30A-B can be embedded in the normal operating fiber span scheme of the system 10. In this way, the control equipment 15 can allow a system operator to remotely connect to the network and remotely log in to equipment anywhere in the network to observe what the OTDR modules 30A-B are reporting.

During system installation and startup, for example, the network management equipment 15 can determine a fiber line loss profile of the fiber link 40 to optimize operation and to identify poor connectors/splices and the like. System diagnostics can be performed to achieve a number of functions, such as: locating a fiber break; performing in-situ monitoring; and locating and monitoring points in the transmission line undergoing degradation. The diagnostics can facilitate preventative maintenance to be scheduled before the issues or degradation becomes an unexpected fiber link failure.

As shown in FIG. 1, the communication system 10 uses OTDR modules 30A-B connected on both ends of a fiber span 42 in the fiber link 40. These OTDR modules 30A-B can be embedded OTDR modules incorporated into the nodes (20A-B) of the fiber-optic communication system 10. Of course, the OTDR modules 30A-B can be independent components capable of integration into the system 10.

Each OTDR module 30A-B includes software and electronics 38 connected to a transmitter 32 and a receiver 34. As will be appreciated, such software and electronics 38 can be implemented in one or more processing units 39a and memory storage units 39b. The transmitter 32 and receiver 34 are connected via a circulator or coupler 36 to the same fiber span 42. The OTDR modules 30A-B can be used independently, or can be used in-concert, depending on the application.

During operations, for example, the OTDR modules 30A-B can perform standard Optical Time Domain Reflectometry (OTDR) to monitor attenuation along the span 42 of the fiber link 40. Additionally, the OTDR modules 30A-B can perform Link Continuity Validation (LCV) to determine a valid closed bidirectional optical circuit between the two nodes (20A-B).

To do OTDR monitoring, both of the OTDR modules 30A-B can check the performance of the fiber optic link 40 and can detect problems in the fiber link 40. For example, a first of the modules 30A uses its high power laser transmitter 32 to inject signals (e.g., a pulse or a series of optical pulses) into the fiber span 42 under test. From the same end of the fiber span 42, the same OTDR module 30A then receives at its receiver 34 any light scattered (Rayleigh backscatter) or reflected back from various points along the fiber span 42. The back-scattered and reflected light returned to the OTDR module 30A is then directed for processing to construct a first OTDR trace of the span 42 from this first direction.

Separately, a second of the modules 30B uses its high power laser transmitter 32 to inject signals (e.g., a pulse or a series of optical pulses) into the fiber span 42 under test. From the same end of the fiber span 42, the same OTDR module 30B then receives at its receiver 34 any light scattered (Rayleigh backscatter) or reflected back from various points along the fiber span 42. The back-scattered and reflected light returned to the OTDR module 30B is then directed for processing to construct a first OTDR trace of the span 42 from this first direction.

As can be seen, the scattered or reflected light when processed produces OTDR traces that can characterize the fiber span 40 from both directions. The particular details of such OTDR traces are known so they are not given here. In general, the traces can indicate splice losses, can be used to measure lengths, can find faults, and can measure attenuation in the fiber span. Overall, the OTDR traces show the performance of components, including the cables, connectors, and splices, of the link 40.

In addition to performing OTDR and LCV, the OTDR modules 30A-B create a dual-direction signal and/or communication channel for communicating between nodes 20A-B. This dual-direction, inter-node communication channel is separate from the optical signals (i.e., the wavelength division multiplexing and channels) for which the fiber-optic communication system 10 is used. Likewise, this dual-direction, inter-node communication channel is separate from the signals (i.e., series of optical pulses) used by the OTDR modules 30A-B for OTDR monitoring. Instead, this dual-direction, inter-node communication channel can allow the OTDR modules 30A-B to share their trace information with one another and to perform other communication functions, such as described below.

For example, the dynamic ranges of each of the OTDR modules 30A-B can be combined by transferring OTDR information from one node 20A to the other node 20B and vice versa. This information transfer is accomplished through a Virtual Supervisory Channel (VSC) in a signal processing domain of the OTDR modules 30A-B. The inter-node communication using such a channel of the OTDR modules 30A-B can be used for a number of purposes, as will be appreciated by the benefit of the present disclosure.

It will be appreciated by one skilled in the art that any suitable forms of processing unit 39a and memory unit 39b can be used for the OTDR module 30A-B, and the details of such hardware components would be known to one skilled in the art. As just one example, the OTDR module 30A-C can include a field-programmable gate array integrated into optoelectronic components 21 of a node 20, which can include a transceiver module, in a fiber optic network.

Figure 2A:
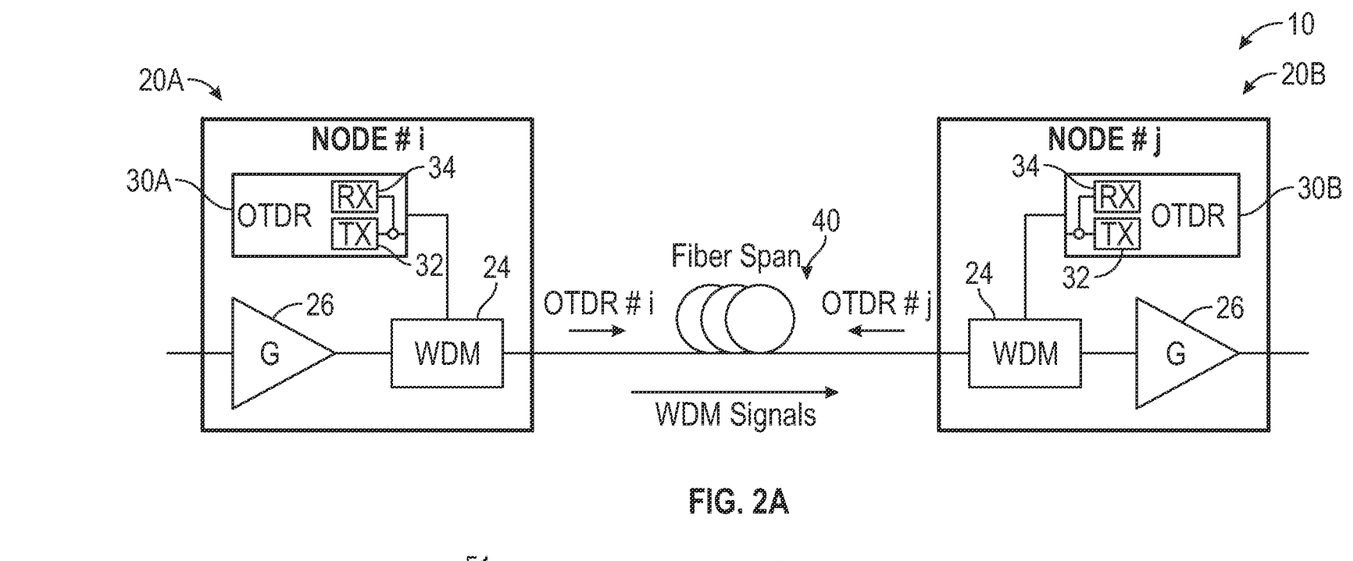
FIG. 2A illustrates examples of embedded OTDR modules of the present disclosure.

Briefly, FIG. 2A illustrates further examples of OTDR modules 30A-B of the present disclosure in a fiber-optic communication system 10. This implementation shows the OTDR modules 30A-B embedded at the nodes 20A-B, one at either end of a fiber span 40. Reference to "embedded" for the OTDR modules 30A-B means that the module 30A-B can be put on a line card in the system 10, as opposed to being a piece of stand-alone Test and Measurement equipment used temporarily on the link 40 but then removed.

As shown, the OTDR modules 30A-B at the nodes 20A-B are typically connected to the fiber link 40 via a Wavelength Division Multiplexer (WDM) filter 24 or other device to route (switch) signals with wavelength selective switching. The laser in the module's transmitter 32 operates at a different optical frequency to the optical frequencies of the transmitters (not shown) in the system 10 so the OTDR laser signals can be multiplexed optically by the WDM filter 24. One OTDR module 30A monitors the span 40 in the same direction as the WDM signals transmitted from one node 20A to the other node 20B, while the other OTDR module 30B monitors the span 40 in the opposite direction.

At the nodes 20A-B, the WDM filters 44 can route OTDR measurement signals and communication signals to the OTDR module 30 and can route the WDM signals to other components of the node 20A-B, such an amplifier 26 or the like. For the OTDR module 30A-B to support communications over the span 40, the receiver 34 of the OTDR module 30A-B needs to support different types of inputs, namely one for OTDR measurement signals and another for communication signals.

Figure 2B:
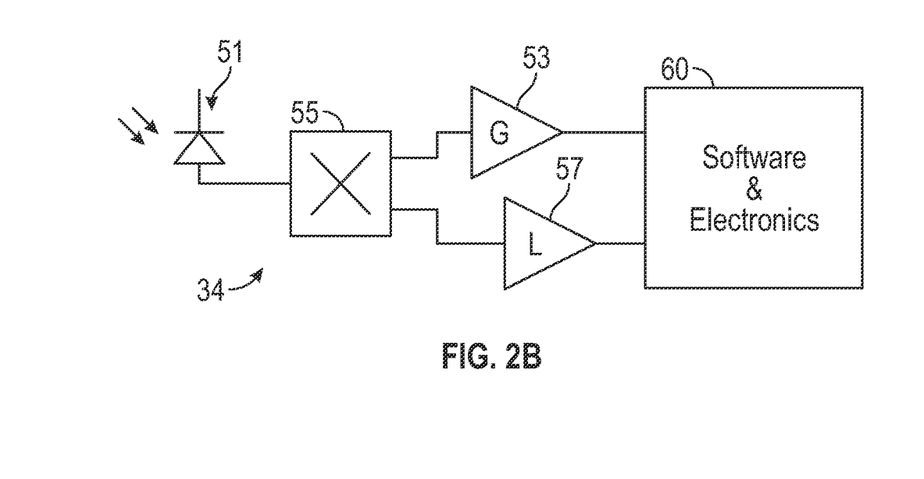
FIG. 2B illustrates details of a receiver for an embedded OTDR module of the present disclosure.

FIG. 2B schematically illustrates a receiver 34 of the OTDR module (30) and additional processing components. For OTDR functions, the receiver 34 is configured to support inputs in the form of pulse or coded signals with high to very low optical power. For communication functions, the receiver 34 is configured to support inputs in the form of digital signals with moderate to low/high optical power.

Therefore, the OTDR receiver 34 preferably employs a linear trans-impedance amplifier (TIA) 57 with variable gain for best performance for the OTDR functions and inputs. In contrast, the OTDR receiver 34 preferably employs a limiting amplifier 57 for correct decisions of binary data used in digital communications. To support both OTDR and communication functions in the OTDR module 30, the receiver 34 can use a reverse-biased photodetector 51, followed by a low-capacitance, wideband electrical switch 55 connecting two paths. One path from the switch 55 is for linear amplification (G) by the linear amplifier 53 for the OTDR functions, and the other path is for the switch 55 is for limiting amplification (L) by the limiting amplifier 57 for digital communication functions. Both of these paths connect to software and electronics equipment 60 of the OTDR module (30) for further processing as disclosed herein.

Figure 3:
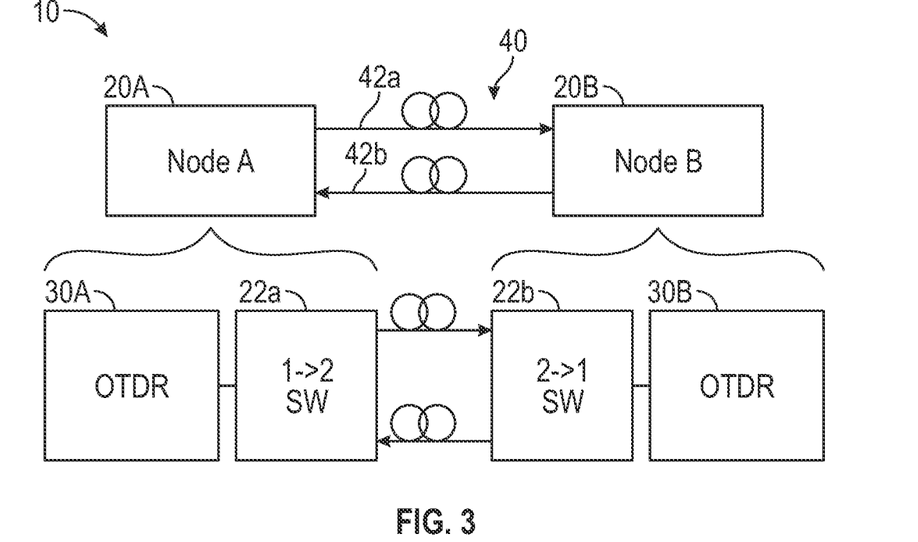
FIG. 3 illustrates optical communication with the dual-direction OTDR modules between nodes utilizing two fiber spans, one for each direction, of a fiber optic link.

FIG. 3 illustrates optical communication with the dual-direction OTDR modules 30A-B in the system 10. An optical switch is used to connect each OTDR to both fiber spans. Two nodes 20A-B are shown, utilizing two fiber spans 42*a-b*, one for each direction. Similar to the system 10 of FIG. 1, the OTDR modules 30A-B can perform optical fiber monitoring between the nodes 20A-B. As shown in FIG. 3, the nodes 20*a-b* use one fiber span 42*a-b* per direction, and the OTDR pulsing is multiplexed to one fiber span 42*a-b* at a time.

The OTDR modules 30A-B are used on both nodes 20A-B for fiber monitoring. A multiplexing switch 22*a-b* monitors the two fiber spans 42*a-b* with one OTDR module 30A-B on each of the nodes 20A-B. Information can be transferred between the OTDR modules 30A-B from one node 20A to the other node 20B and vice versa for any suitable purpose. Again, this information transfer is accomplished through a Virtual Supervisory Channel (VSC) in a signal processing domain of the OTDR modules 30A-B. Details of the inter-node communication using such a channel the OTDR modules 30A-B is described in more detail below.

Figure 4:
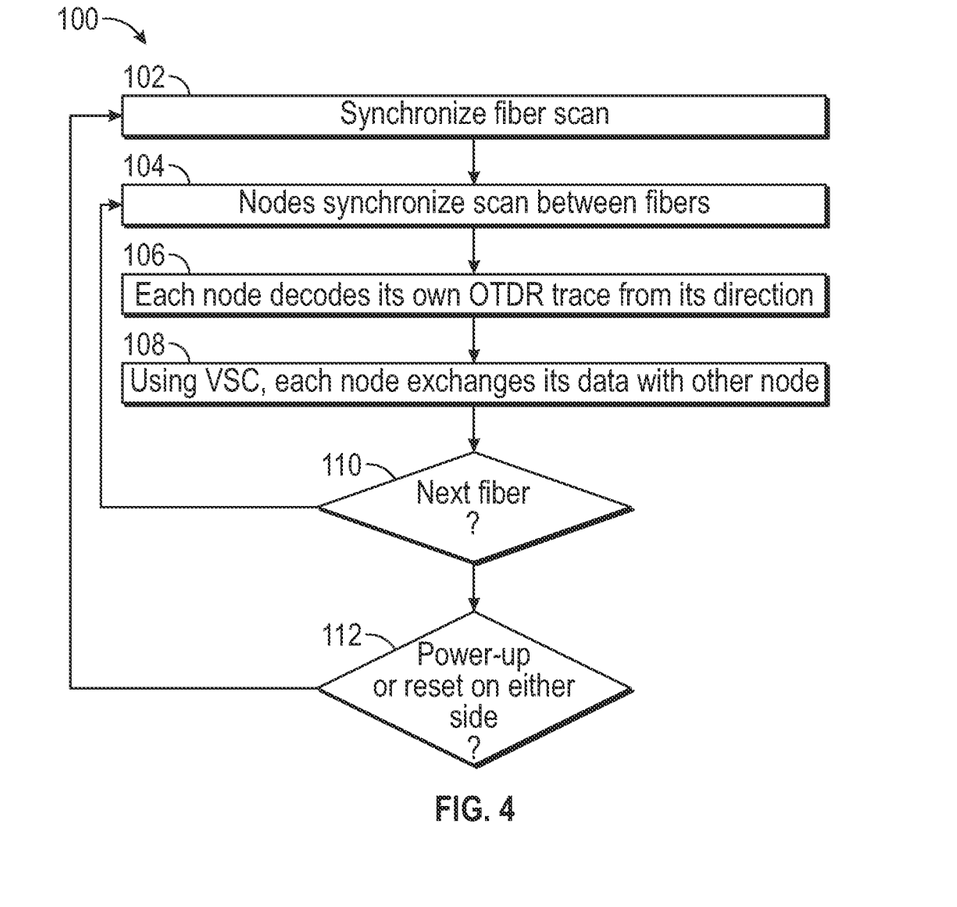
FIG. 4 illustrates a process for inter-node communications using the dual-direction OTDR modules.

FIG. 4 illustrates a process 100 for inter-node communication using the dual-direction OTDR modules 30A-B of the system 10 as in FIG. 3. During operation, the nodes 20A-B synchronize their fiber scans (Block 102). This can uses protocols similar to carrier-sense multiple access/collision detect (CSMA/CD) protocols. Once synchronized, the nodes 20A-B alternate the scans between fiber spans 42A-B by using the switch 22*a-b* so simultaneous probing on the same fiber span 42*a-b* can be prevented from both directions (Block 104).

Each node 20A-B decodes its own OTDR trace from its direction (Block 106). Using the communication channel (VCS) between the OTDR modules 30A-B over the link 40, the nodes 20*a-b* exchange their respective data with the other node 20A-B (Block 108). The process 100 repeats Blocks 104 through 108 for the next fiber span 42*a-b* (Decision 110) so that both fiber spans 42*a-b* are traced. The process 100 is entered (and repeated) during power-up or reset on either side of the communication link 40 (Block 112).

Having an understanding of the inter-node communication, further details related to the signal processing and communication protocols are discussed below.

Figure 5:
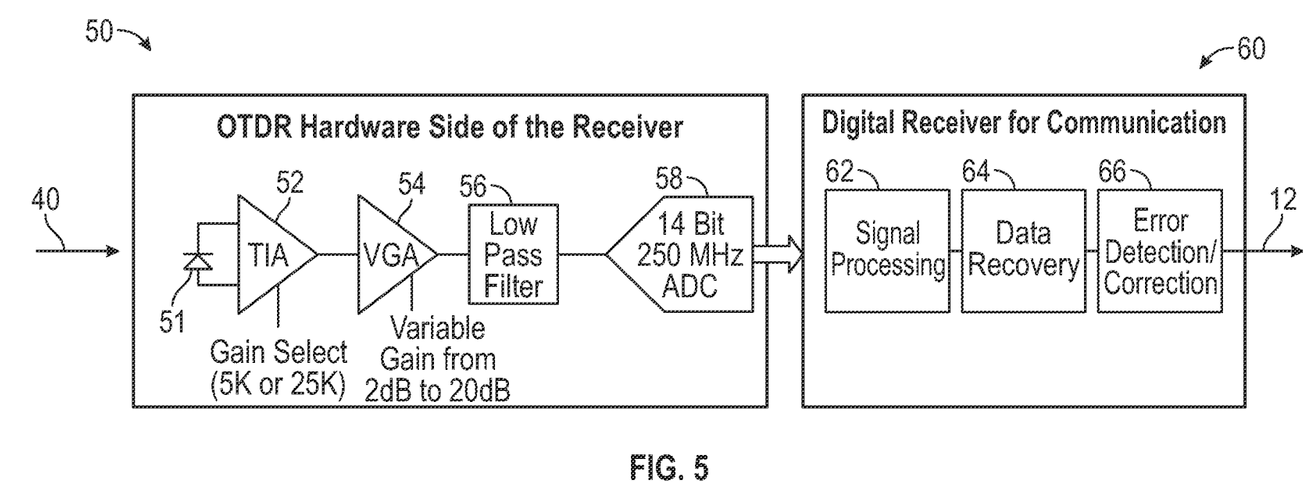
FIG. 5 illustrates a configuration fora receiver in a dual-direction OTDR module of the present disclosure.

FIG. 5 illustrates a configuration for a receiver 50 for use in a dual-direction OTDR module (30). The OTDR module's receiver 50 includes an analog front-end on the hardware side followed by a digital receiver 60 used for communication processing on the network side 12. The analog front-end includes a photodiode 51, a transimpedance amplifier 52, a variable gain amplifier 54, a low pass filter 56, and an analog-to-digital converter 58. The photodiode 51 detects optical signals from the fiber link 40 during operations.

For OTDR processing, the photodiode 51 detects light scattered (Rayleigh backscatter) or reflected back from various points along the fiber in response to the signals (e.g., a series of optical pulses) injected into the fiber link 40 under test from the same node's transmitter (not shown). The OTDR's front end hardware 50 can process the scattered or reflected light so traces can be produced that characterize the optical fiber link 40, as noted herein.

For inter-node communication, the photodiode 51 detects light transmitted on the link 40 from another node according to the communication channel. The OTDR module's receiver 50 receives the light and uses the analog-to-digital convertor 58 to pass signals to the digital receiver 60. For handling the channel communications, the digital receiver 60 includes signal processing 62, data recovery 64, and error detection/correction 66. For the signal processing 62, software filters are used for enhancing signal to noise ratio. For data recovery 64, a demodulator is used and can be based on frequency-shift keying (FSK), orthogonal frequency-division multiplexing (OFDM), amplitude-shift keying (ASK), etc. Data slicing can be performed. The Error Detection/Correction 66 can use computations based on Parity, cyclic Redundancy Checks (CRC), Error Correction Codes (ECC), etc. The digital receiver 60 can be implemented in the electronics (38: FIG. 1A) of the OTDR module (30), such as in a digital signal processor (39*a*), or in other electronics (21) of the node (20) without additional hardware needed. The communication receiver 60 is implemented using signal processing in the digital domain.

Figure 6:
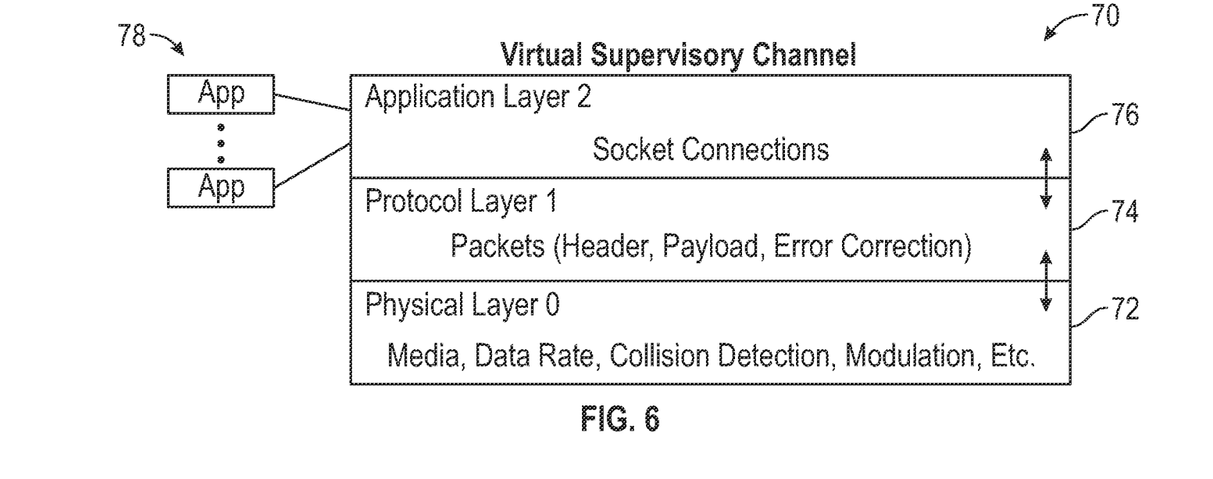
FIG. 6 illustrates example layers of an inter-node communication channel according to the present disclosure.

As noted above, a Virtual Supervisory Channel can be used for inter-node communications between the OTDR modules 30A-B when not operated in standard use for tracing a fiber span. FIG. 6 diagrams a communication protocol 70 having some example layers of the Virtual Supervisory Channel. The communication protocol 70 has a physical layer 72, a protocol layer 74, and an application layer 76. As will be appreciated, the communication protocol 70 can use more or less such layers depending on the desired complexity.

The physical layer 72 covers media access (i.e., defines the hardware and other physical aspects used to send and receive data). The layer 72 can employ collision detection with random timeout between the nodes for the synchronization to be achieved. The physical layer 72 can be based on suitable modulation, symbol, and data rate, each of which can be chosen by mutual exchange of data streams at various data and symbol rates. For robust communications, the communication channel preferably uses variables that yield the lowest error rate.

This physical layer 72 interfaces only to the protocol layer 74. For its part, the protocol layer 74 covers how information is exchanged between two nodes 20 and can include details of the packets, such as header, payload, error detection/correction (CRC/ECC), and the like used. Such a protocol layer 74 can be responsible for encoding and decoding data packets to transmit data from node to node and can handle errors, congestion, and packet sequencing. This protocol layer 74 is independent of physical layer 72 and the application layer 76, but interfaces with both.

The application layer 76 provides interfaces for various applications 78 that can use the inter-node communications between the OTDR modules 30 of the nodes 20. For example, various applications 78 can use the Virtual Supervisory Channel through socket-like connections. Applications 78 can use the communication protocol 70 to exchange OTDR traces between the nodes, to exchange status information between the nodes (e.g., node supervisory information), to send control information between the nodes, to downhole code at the nodes, and the like.

Figure 7A:
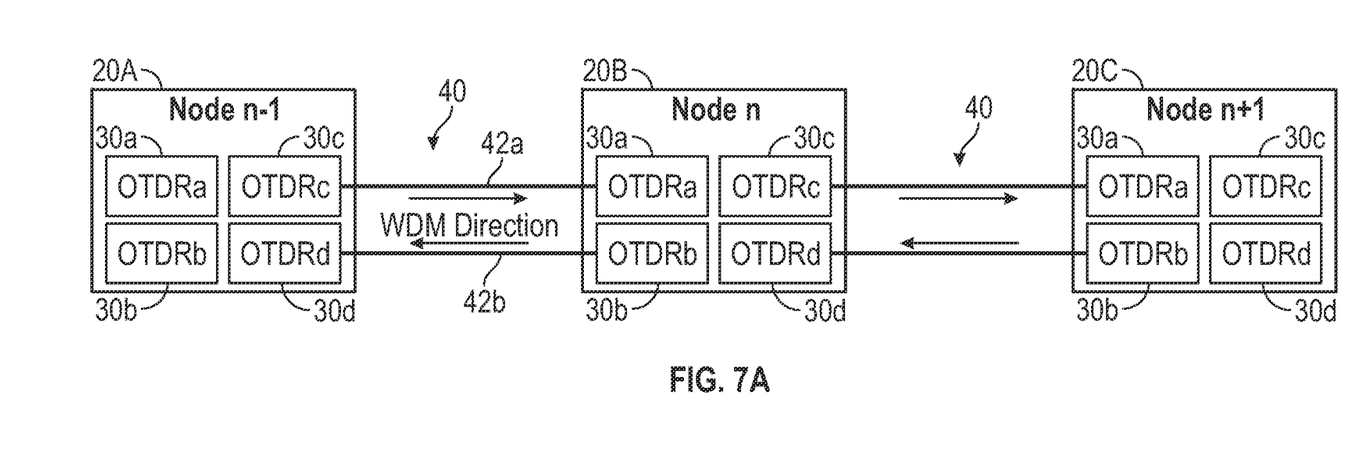
FIG. 7A illustrates a fiber-optic communication system having multiple dual-direction OTDR modules at each node.
Figure 7B:
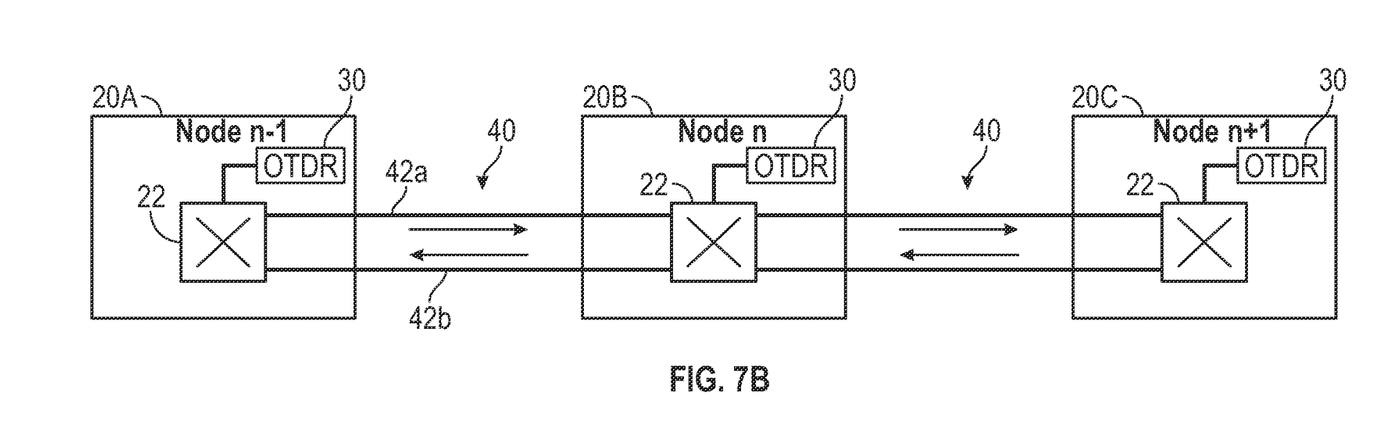
FIG. 7B illustrates a fiber-optic communication system having a shared dual-direction OTDR module and an optical switch at each node.

As noted previously, the dual-direction OTDR modules 30 may use an optical switch control. As shown in FIGS. 7A-7B, for example, the OTDR modules 30A-C may monitor and communicate along multiple fiber spans (e.g. East and West, incoming and outgoing).

FIG. 7A shows nodes 20A-C having single OTDR modules 30a-d per span 42a-b of the links 40. For example, each node 20A-C has four OTDR modules 30a-d, one for each span 42a-d connected to the links 40 to other nodes 20A-C. Communications using the supervisory channel between the OTDR modules 30a-d are each naturally segregated, which makes the communications more straightforward. However, this arrangement duplicates the hardware configurations required at the nodes 20A-C.

In contrast, FIG. 7B shows nodes 20A-C having an OTDR module 30A-C connected to a switch 22 for selectively connecting the module 30A-C to a given span 42a-b of the links 40. As can be seen, the hardware configurations at the nodes 20A-C are simplified, but communications using the supervisory channel between the OTDR modules 30a-d are not naturally segregated.

In particular, the OTDR switches 22 at the nodes 20A-C on either side of a fiber span 42 are not synchronized, so there is no guarantee that the OTDR modules 30A-C on either end of a fiber span 42 will monitor the same span at the same time. External information, such as from a manual configuration can be used to control the synchronization. For successful communication, in the absence of such external information (e.g. from manual configuration), however, a number of approaches can be used to communicate between the asynchronous transmitter/receiver sources.

Figure 8:
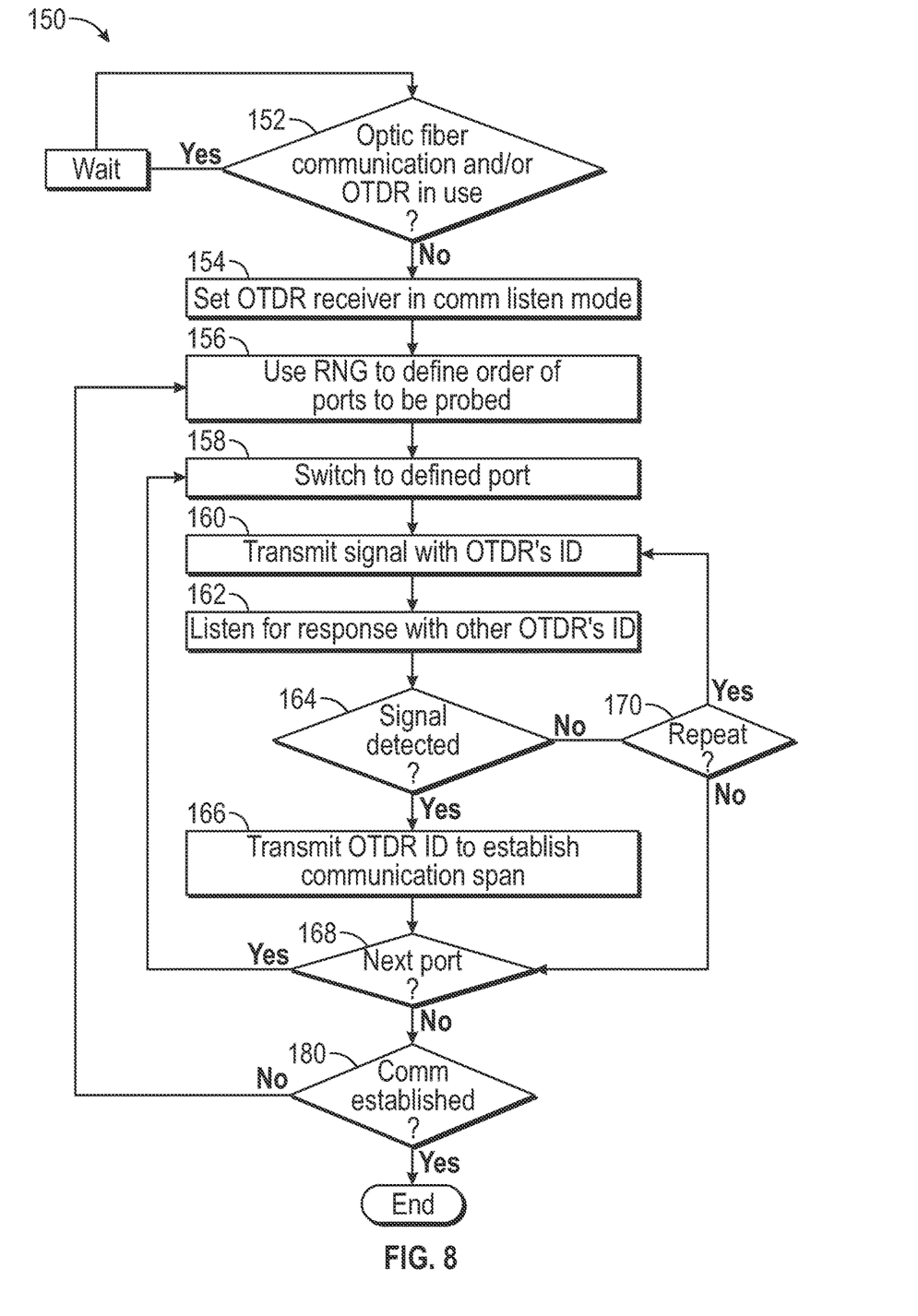
FIG. 8 illustrates an example of a timing protocol for communications between switched OTDR modules of the present disclosure.

In a specific embodiment, a timing protocol can be used that ensures that OTDR modules 30 on either end of a fiber span 42 are both listening and transmitting on that fiber span 42. For example, FIG. 8 illustrates a timing protocol 150 for communications between switched OTDR modules 30 of the present disclosure. The example timing protocol 150 handles communications between switched OTDR modules 30, such as in the configuration of FIG. 7B. In the present example, the timing protocol 150 is based on a Random Number Generator (RNG), but other timing configurations can be used. In general, the timing protocol may be random or may use some other defined period of time.

As noted previously, a given OTDR module 30 can be used in standard operation to monitor operation and performance of the fiber spans 42. Likewise, the fiber-optic communication system 10 may be operating in standard operations for fiber optic communication in which optical signals are being transmitted along the fiber link 40. If the system 10 is operating in standard operations, then it may not be desirable to perform OTDR monitoring with the OTDR modules 30, and/or it may not be desirable to use inter-node communications with the OTDR modules 30. Accordingly, the protocol 150 may first determine whether the module 30 is currently performing an OTDR operation, and/or the protocol 150 may first determine whether the system 10 is operating in standard operations for fiber-optic communications (Decision 152). If either of these cases apply, then using the OTDR modules 30 for inter-node communications may be delayed. If acceptable for a given implementation, however, inter-node communications could be performed at appropriate times for the purposed disclosed herein.

When the OTDR module 30 is not in use, a near-end OTDR's receiver 34 operates in "Communication Listen" mode to listen for communications (Block 154). The near-end OTDR module 30 defines an order of ports to be probed (Block 156), and the module 30 uses the switch 22 to switch to the first defined port (Block 158). Defining the order of ports can be random using a random number generator (RNG) or can use optimal port selection methods, such as those known and used in the art for multi-connection links.

With the first port selected, the near-end OTDR module 30 uses its transmitter TX to transmit an initial communication (e.g., an identifier (ID) or the like) of the OTDR module 30 for a defined (e.g., random) period of time (Block 160). The identifier can be any suitable arrangement of pulses set to an established protocol.

After sending the OTDR's identifier, the near-end OTRD module 30 then listens for a far-end OTDR's response (e.g., the far-end's identifier (ID)) for a defined (e.g., random) period of time (Block 162). An RNG value greater than a minimum can be set to determine that a signal from the span communications has been detected (Decision 164).

When a response is received, it may be decoded with processing, and any verification or lookup steps can be taken. When a response is detected from a far-end OTDR module 30 in that time period, the near-end OTDR module 30 transmits a confirmation communication (i.e., retransmits its OTDR identifier again) in a handshake to the far-end OTDR module 30 and establishes the inter-node communication channel, defining a repeating time period for future communications (Block 166).

If no response is detected at the near-end OTDR module 30, the module 30 repeats Blocks 160 through 166 up to a predetermined number N times (Decision 170) at least until a response is detected (Decision 164) and an inter-node communication channel is established (Block 166) or until another port needs to be probed (Decision 168). For example, the near-end OTDR module 30 returns through Blocks 158 to 168 to probe all of the ports of the module 30 connected to fiber links.

If an inter-node communication channel is not established for one or more ports on the near-end OTDR module 30 (Decision 180), the module 30 may return to Block 156, reordering the port order and retrying to establish the communication channel. In the end, the protocol 150 seeks to establish the communication channel on the ports to the far-end module.

Other approaches are possible. For example, a global timing signal can be used to synchronize control of the optical switches 22 and the nodes 30.

In summary of the details disclosed herein, the dual-direction OTDR modules 30 in the system 10 provide an inter-node communication channel in which the OTDR modules 30 are located at ends of fiber spans 42. The modules 30 can perform autonomous communications between adjacent nodes 20 at either end of the fiber span 42 without the need for control via separate network management equipment 15. As noted, the inter-node communication channel between the OTDR modules 30 can be achieved on multiple fiber spans 42 using optical switches 22 for time-division sharing. The communication channel can be bi-directional for a disaggregated network.

The dual-direction OTDR modules 30 of the system 10 can offer advanced OTDR capabilities that can be achieved by coordinating measurements at either end of a span 42. For example, the dual-direction OTDR modules 30 can provide OTDR traces that have about two times the dynamic range compared to just an individual OTDR module. Likewise, the dual-direction OTDR modules 30 can provide an embedded OTDR solution that does not disrupt live traffic along the fiber span 42.

The dual-direction OTDR modules 30 and their inter-node communication channel can be used in a number of applications. In one example, the dual-direction OTDR modules 30 can provide inter-node communications in a disaggregated network. In such a disaggregated network, there may be no centralized network management equipment 15. Instead, each node 20 may operate autonomously, and communications are not directly supported between nodes 20 in the disaggregated network. Using the dual-direction OTDR modules 30 of the present disclosure, the OTDR modules 30 on each end of disaggregated spans 42 can be used to create an inter-node communication channel between the nodes 20 for a number of purposes.

For example, the inter-node communication channel between the modules 30 can be used for setup configuration of the system 10. Using communications between the modules 30 over the inter-node communication channel, upstream nodes 20 can inform downstream nodes 20 that they are optically configured so the downstream nodes 20 can then turn-up.

The inter-node communication channel can be used for fault isolation to detect and isolate sections of the system 10 where fiber damage occurs between nodes 20. The setup configuration and fault isolation can be particularly useful for high-power Raman systems, where eye safety is of critical importance.

The inter-node communication channel can be used for OTDR synchronization. For example, the OTDR modules 30 on either side of a fiber span 42 can be synchronized using communications on the channel to avoid collisions in each other's measurement window.

As one skilled in the art will appreciate with the benefit of the present disclosure, the OTDR modules 30 have a number of advanced capabilities and can communicate/exchange various forms of information from one node to the other and vice versa. At a minimum, the OTDR modules 30 can communicate/exchange information concerning: (1) operation of the module 30, (2) the OTDR trace conducted by the module 30, (3) the setup of the OTDR module 30, (4) a fault on the link, (5) synchronization details to avoid conflicts in a measurement window, and (6) other such information on the established communication channel over the at least one fiber link from one node to the other and vice versa.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method implemented at a first optical time-domain reflectometry (OTDR) module connected to at least one fiber link of a fiber optic communication network, the OTDR module connected to a plurality of fiber spans of the at least one fiber link, the method comprising:
    performing, with the first OTDR module, an OTDR operation on the at least one fiber link;
    sending, from the first OTDR module when not performing the OTDR operation, a first communication on the at least one fiber link by:
        defining an order of ports on the first OTDR module to be probed, each of the ports connected to one of the fiber spans;
        switching to a first of the ports in the defined order; and
        transmitting the first communication on a first of the fiber spans associated with the first port;
    receiving, at the first OTDR module, a response on the at least one fiber link having a second communication;
    sending, from the first OTDR module, a confirmation communication on the at least one fiber link in response to the receipt of the second communication; and
    establishing, with the first OTDR module, a communication channel on the at least one fiber link.

2. The method of claim 1, wherein the first communication comprises a first identifier identifying the first OTDR module.

3. The method of claim 2, wherein sending the confirmation communication comprises resending, from the first OTDR module, the first identifier on the at least one fiber link in response to the receipt of the response.

4. The method of claim 1, wherein defining the order of the ports comprises defining the order randomly or using port selection.

5. The method of claim 1, wherein sending the first communication on the at least one fiber link further comprises listening for the response at the first port for a defined period of time; retransmitting the first communication in response to termination of the defined period of time; and repeating for a predetermined number of times.

6. The method of claim 1, wherein sending the first communication on the at least one fiber link further comprises:
switching to a next of the ports in the defined order in response to a failure to receive the response at the first port; and
transmitting the first communication on a second of the fiber spans associated with the next port.

7. The method of claim 1, wherein performing the OTDR operation comprises synchronizing scans of the at least one fiber link for the first OTDR module with a second OTDR module.

8. The method of claim 1, wherein performing the OTDR operation comprises:
obtaining, at the first OTDR module, a first OTDR trace in a first direction of the at least one fiber link; and
decoding, at the first OTDR module, the first OTDR trace.

9. The method of claim 8, further comprising sending, from the first OTDR module, the first OTDR trace on the established communication channel on the at least one fiber link.

10. The method of claim 1, further comprising sending information from the first OTDR module on the established communication channel to one or more second OTDR modules on the at least one fiber link.

11. The method of claim 1, comprising performing the step of establishing the communication channel during power-up or reset of the first OTDR module.

12. The method of claim 1, further comprising sending information on the established communication channel from the first OTDR module along the at least one fiber link.

13. The method of claim 12, wherein the information is selected from the group consisting of first data to configure setup of nodes on the at least one fiber link, second data of a fault between nodes of the at least one fiber link, and third data to synchronize the first OTDR module with one or more second OTDR modules on the at least one fiber link.

14. The method of claim 1, further comprising:
receiving, at a second OTDR module connected to the at least one fiber link, the first communication on the at least one fiber link;
sending, from the second OTDR module, the response on the at least one fiber link having the second communication of the second OTDR module; and
receiving, at the second OTDR module, the confirmation on the at least one fiber link in response to the sending of the second communication.

15. A method implemented at an optical time-domain reflectometry (OTDR) module connected to at least one fiber link, the method comprising:
performing, with the OTDR module, an OTDR operation on the at least one fiber link;
receiving, at the OTDR module when not performing the OTDR operation, a first communication on the at least one fiber link;
sending, from the OTDR module, a response on the at least one fiber link having a second communication of the OTDR module;
receiving, at the OTDR module, a resend of the first communication on the at least one fiber link in response to the sending of the second communication; and
establishing a communication channel on the at least one fiber link in response thereto.

16. The method of claim 15, further comprising sending information on the established communication channel from the OTDR module along the at least one fiber link.

17. The method of claim 16, wherein the information is selected from the group consisting of first data to configure setup of nodes on the at least one fiber link, second data of a fault between nodes of the at least one fiber link, third data to synchronize the OTDR module with one or more other OTDR modules on the at least one fiber link; and an OTDR trace of the at least one fiber link decoded by the OTDR module.

18. An apparatus connected to at least one fiber link to perform optical time-domain reflectometry (OTDR), the apparatus comprising:
a transmitter configured to transmit optical signals;
a receiver configured to receive optical signals;
a connection configured to couple the transmitter and the receiver to the at least one fiber link; and
a processing unit in operable communication with the transmitter and the receiver, the processing unit being configured to:
perform an OTDR operation on the at least one fiber link;
send, from the transmitter when not performing the OTDR operation, a first communication on the at least one fiber link;
receive, at the receiver, a response on the at least one fiber link having a second communication;
resend, from the transmitter, the first communication on the at least one fiber link in response to the receipt of the second communication; and
establish a communication channel on the at least one fiber link.

19. The apparatus of claim 18, wherein the connection comprises a circulator or a coupler, and an optical switch.

20. The apparatus of claim 18, comprising memory storing a communication protocol for the communication channel, wherein to establish the communication channel, the at least one processing unit is configured to: access the communication protocol; and construct the first communication based on the communication protocol.

21. The apparatus of claim 18, wherein to send, from the apparatus when not performing the OTDR operation, the first communication on the at least one fiber link, the processing unit is configured to:
define an order of ports on the apparatus to be probed, each of the ports connected to one of the fiber spans;
switch to a first of the ports in the defined order; and
transmit the first communication on a first of the fiber spans associated with the first port.

22. The apparatus of claim 21, wherein to define the order of the ports, the processing unit is configured to define the order randomly or using port selection.

23. The apparatus of claim 21, wherein to send the first communication on the at least one fiber link, the processing unit is further configured to listen for the response at the first port for a defined period of time; retransmit the first communication in response to termination of the defined period of time; and repeat for a predetermined number of times.

24. The apparatus of claim 21, wherein to send the first communication on the at least one fiber link, the processing unit is further configured to:
switch to a next of the ports in the defined order in response to a failure to receive the response at the first port; and transmit the first communication on a second of the fiber spans associated with the next port.

25. The apparatus of claim 18, wherein the processing unit is further configured to send information on the established communication channel from the apparatus along the at least one fiber link.

26. The apparatus of claim 25, wherein the information is selected from the group consisting of first data to configure setup of nodes on the at least one fiber link, second data of a fault between nodes of the at least one fiber link, third data to synchronize the apparatus with one or more OTDR modules on the at least one fiber link; and an OTDR trace of the at least one fiber link decoded by the apparatus.

27. An apparatus connected to at least one fiber link to perform optical time-domain reflectometry (OTDR), the apparatus comprising:
   a transmitter configured to transmit optical signals;
   a receiver configured to receive optical signals;
   a connection configured to couple the transmitter and the receiver to the at least one fiber link; and
   a processing unit in operable communication with the transmitter and the receiver, the processing unit being configured to:
      perform an OTDR operation on the fiber link;
      receive, at the receiver when not performing the OTDR operation, a first communication on the at least one fiber link;
      send, from the transmitter, a response on the at least one fiber link having a second communication of the OTDR module;
      receive, at the receiver, a resend of the first communication on the at least one fiber link in response to the sending of the second identifier; and
      establish a communication channel on the at least one fiber link in response thereto.

28. The apparatus of claim 27, wherein the processing unit is further configured to send information on the established communication channel from the apparatus along the at least one fiber link.

29. The apparatus of claim 28, wherein the information is selected from the group consisting of first data to configure setup of nodes on the at least one fiber link, second data of a fault between nodes of the at least one fiber link, third data to synchronize the apparatus with one or more OTDR modules on the at least one fiber link; and an OTDR trace of the at least one fiber link decoded by the apparatus.

* * * * *